Feb. 8, 1966   E. H. SCHWARTZ   3,233,711
DRIVE FOR A CONVEYOR DOOR AND LOADING PLATFORM
Filed Sept. 6, 1963   2 Sheets-Sheet 1
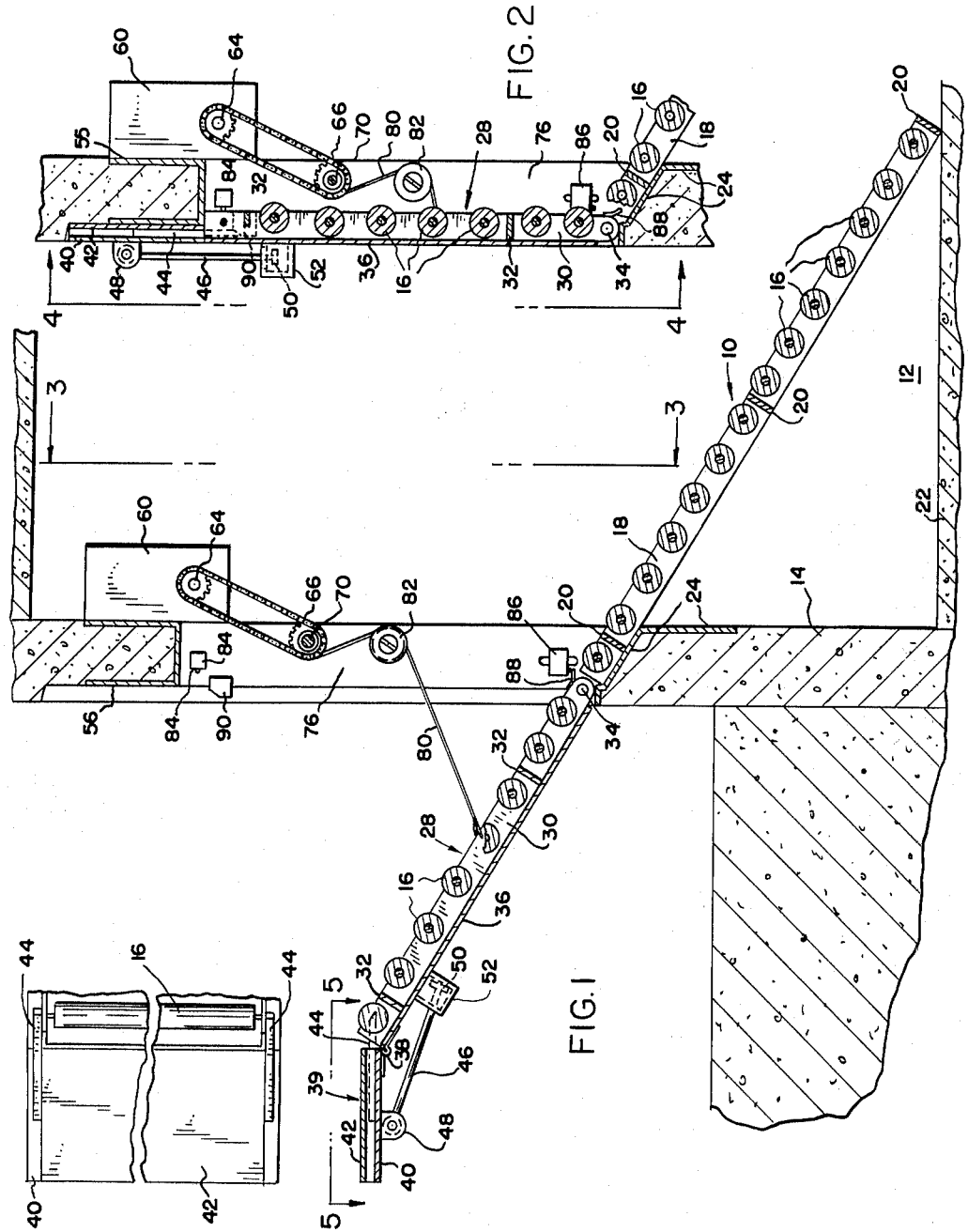
INVENTOR.
ERNEST H. SCHWARTZ
BY
ATTORNEY

INVENTOR.
ERNEST H. SCHWARTZ
BY
ATTORNEY.

United States Patent Office 3,233,711
Patented Feb. 8, 1966

3,233,711
DRIVE FOR A CONVEYOR DOOR AND
LOADING PLATFORM
Ernest H. Schwartz, 1403 Monroe St., Hollywood, Fla.
Filed Sept. 6, 1963, Ser. No. 307,164
3 Claims. (Cl. 193—33)

This application is a continuation-in-part of my copending application, Serial No. 148,243, filed October 27, 1961, now Patent No. 3,104,748, filed September 24, 1963, for a Conveyor Door and Loading Platform. That application relates to a door, which, when opened forms an extension of a conveyor which projects adjacent to one of its sides and which door also forms a loading platform for the conveyor.

My invention, as disclosed in that prior application, particularly finds use in situations where a conveyor is disposed within a building so as to be useful in transporting articles and material toward and away from an opening in one of the building's walls. One end of the conveyor terminates immediately adjacent to the wall and the other end extends to a remote location within the building. In such remote locations, it is often at a depressed level with respect to the wall opening so that a gravity conveyor may be employed, although the present invention is also useful in connection with powered conveyors which may transport articles to an elevated location. The present invention particularly contemplates a door for such wall opening which hinges about a horizontal axis so that it seals the wall opening when in a vertical position. The door has conveyor elements, such as rollers, disposed about its inner surface so that when the door is opened to a position wherein it is inclined with respect to the vertical axis, it forms an extension of the conveyor beyond the wall of the building to a height readily accessible from trucks.

At its end, which is disposed away from the building when the door is at an opened poistion, there is carried a platform which is hinged to the door about a horizontal axis. When the door is closed, mechanism is provided for extending the platform parallel to the door so that it acts as an extension thereof and is operative to close off the wall opening or is at least recessed therewithin so as to be unobtrusive with respect to the wall. When the door is opened so as to form an extension of the conveyor, the mechanism is operative to rotate the platform about its line of juncture with the door so as to cause it to extend in the horizontal plane and thus, normally extend at an angle with respect to the door which is inclined with respect to the horizontal. The platform may also have conveyor elements along a section of its upper surface.

In my prior application I disclosed a preferred embodiment of the invention in which hydraulic cylinders were employed to move the door between its open and closed positions. In the present application I disclose an improved system for actuation of the door mechanism. A preferred embodiment of this improved system which will be subsequently described in greater detail, comprises a motor-actuated pulley mechanism to which the door is connected by means of strands of rope or wire adapted to wind about the pulley structure. Limit switches are provided in the mechanism for shutting off the motor when the door reaches its extreme open or closed position.

It is therefore a principal object to the present invention to provide an improved drive system for a conveyor door and loading platform of the type described in my co-pending application, Serial No. 148,243.

A further object is to provide a drive system of this kind which is economical to manufacture, reliable in operation, and easy to repair.

By employing a motorized system for my door assembly, hydraulic cylinders and their attendant problems of installation and maintenance are avoided. In addition the present system permits the door to be opened to any position intermediate its full open and closed positions so as to be useful in conjunction with trucks or other vehicles having a floor of any elevation.

Other objects, advantages, and applications of the present invention will be made apparent from the following detailed description of a preferred embodiment of the invention. The description makes reference to the accompanying drawings in which:

FIGURE 1 is a sectional elevation view through the wall and the conveyor-door in an opened position;

FIGURE 2 is a partial sectional elevation view of the conveyor door in closed position;

FIGURE 5 is a plan view of the loading platform taken along the lines 5—5 in FIGURE 1.

Figure 3:
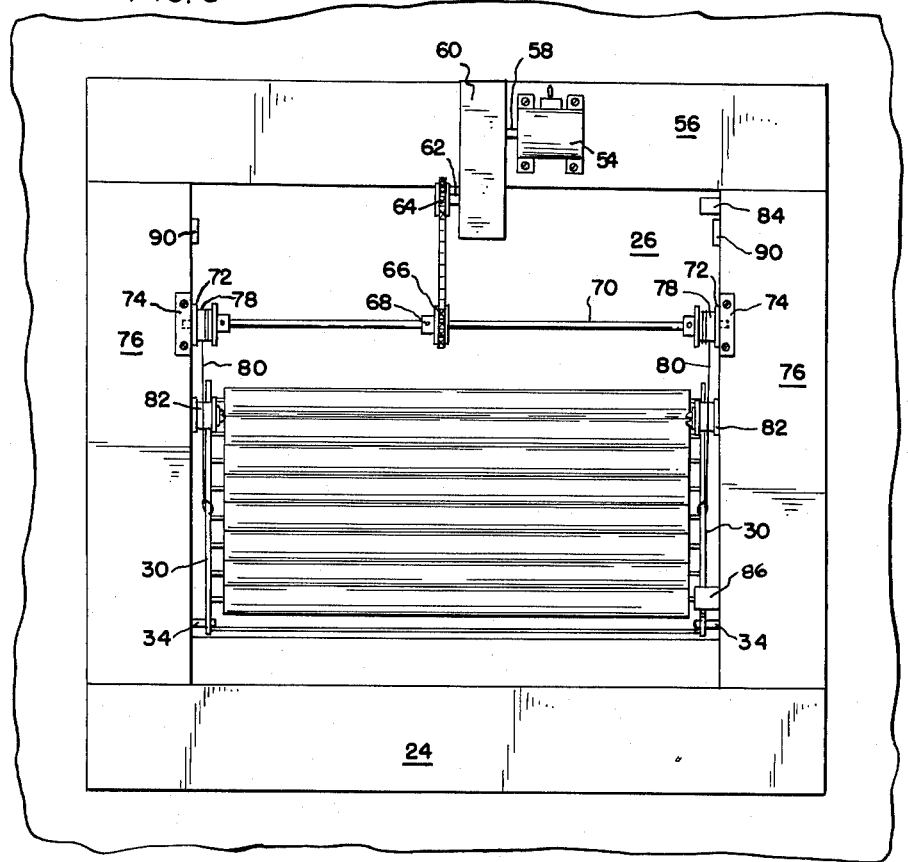
FIGURE 3 is a partial elevational view taken along the lines 3—3 in FIGURE 1.
Figure 4:
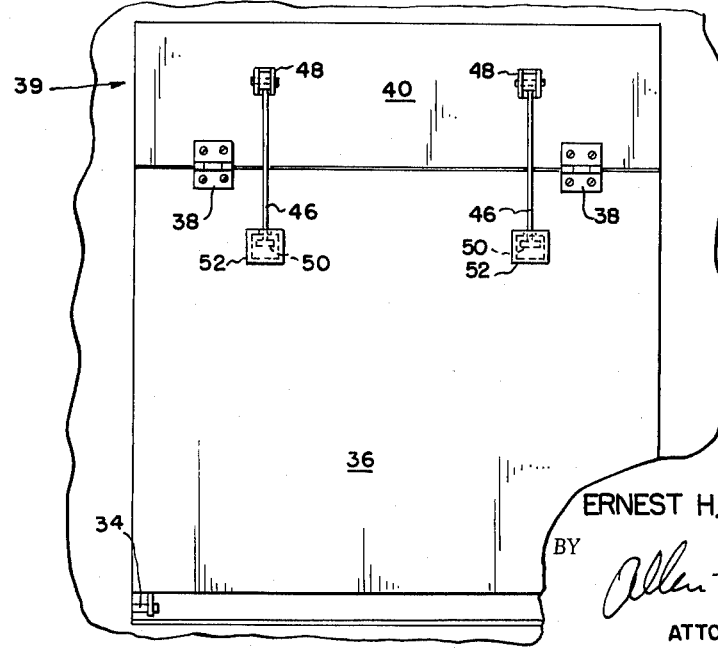
FIGURE 4 is a partial elevational view taken along the lines 4—4 in FIGURE 2.

The invention is illustrated in connection with a roller conveyor, generally indicated at 10, which communicates between the basement area 12 of a building and an outer wall 14 of the building. The conveyor 10 is formed of a plurality of roller elements 16 which have their axes in horizontal planes and are journaled in bearings supported in two end channel sections 18. Steel reinforcing plates 20 extend transversely between the channel sections 18 at regular intervals in order to separate the channels and stiffen the structure. The lower end of the conveyor rests on the floor 22 of the basement area 12 while the upper end of the conveyor rests in an inclined sill member 24 fitted on the lower edge of a rectangular wall opening 26. The rollers 16 extend beyond the upper line of the channel sections 18 so that articles may be rolled down the conveyor in the normal manner.

The door, generally indicated at 28, is also formed about a pair of parallel channel sections 30 joined by transverse steel bars 32. Both channel sections 30 are hinged at their lower edge about pins 34 retained within the wall 14 on opposite sides of the lower edge of the opening 26. The outer edge of the door 28 is covered by a plate 36 which is welded to the channels 30 and the cross members 32 and acts as the cover for the wall opening when the door is in a closed position.

Hinges 38 which are attached to the outward end of the plate 36 carry a loading platform 39 comprising a plate 40 upon which is mounted a channel member 42 and longitudinal bars 44 extending past the hinges 38. A pair of rods 46 are pivoted about supports 48 projecting from the plate 40. The free ends of the rods 46 have stops 50 which move within enclosures 52 projecting from the plate 36. When the door 28 is in its open position as shown in FIGURE 1, the loading platform 39 moves by gravity to its horizontal orientation; the stops 50 bear against the interior of the enclosures 52 and prevent the loading platform from pivoting further about the hinges 38.

As shown in FIGURE 3, a motor 54 is mounted in a channel section 56 which is fitted into the upper edge of the wall opening 26. The motor rotates a shaft 58 which rotates a series of reducing gears (not shown) which are disposed within the box indicated at 60. The output shaft 62 of these reducing gears is fixed to a gear 64 chain-connected to a second lower gear 66. The lower gear is fixed by pin 68 on a shaft 70 which is journaled in bearings 72 fixed to brackets 74. The brackets are fastened to channel sections 76 which between the sill member 24 and the channel section 56 along vertical edges of the wall opening.

The shaft 70 includes collars 78 at each end around which are wound cables 80. Each cable winds around a portion of a pulley 82 rotatably mounted along the interior of the wall opening 26 as shown in FIGURE 1. The free end of each cable is fastened to the edge of channel 30 at approximately its midpoint.

It can thus be seen that actuation of the motor 54 causes rotation of the shafts 58, 62 and 70 and causes the cables 80 to be either wound or unwound about the collars 78. Winding or unwinding the cables causes a corresponding raising or lowering of the door 28.

A conventional limit switch 84 fixed along the upper portion of one of the channel sections 76 is adapted to cut off power to the motor 54 when actuated. When the door is raised to its closed position as shown in FIGURE 2, the edge of the channel 30 actuates the limit switch, thus shutting off the entire mechanism.

A second limit switch 86 is located along the lower portion of one of the channel sections 76 and is similarly adapted to cut off power to the motor when actuated. The portion of one of the channel sections 30 adjacent to the pin 34 includes a tab 88 which is adapted to actuate the limit switch 86 when the door is in fully open position as shown in FIGURE 1. The position of the limit switch 86 may be adjustable so as to permit variation in the fully open position of the door.

Stops 90 are fastened along the upper portion of the channel sections 76 and are adapted to strike the projecting ends of the longitudinal bars 44 when the door is raised to closed position. This causes the loading platform to pivot about the hinges 38 and assume the vertical orientation shown in FIGURE 2. In this position the channel 42 fits against the upper channel section 56.

In operation, the door may be lowered simply by actuation of the motor 54. This causes rotation of the shaft 70 thus unwinding the cables 80 and allowing the door to pivot downward under the force of gravity about the pins 34. The loading platform 39 falls to its horizontal position. The door continues to lower until the tab 88 strikes the limit switch 86, cutting off the power to the motor.

To raise the door, the motor is reversed, causing the cables to wind about the collars on the shaft 70 and thus causing the door to pivot upwards about the pins 34. As the stops 90 strike the bars 44 of the loading platform 39, the latter is pivoted to its vertical position about the hinges 38. When the door reaches its vertical position it actuates the limit switch 84 cutting off the power to the motor.

It can be seen that the door may be lowered to any position intermediate its extreme upper and lower positions if desired since the cables 80 support the door at all times.

Having thus described my invention, I claim:

1. A device for use in connection with a wall having an aperture therein, comprising: a planar door member having a shape substantially that of said aperture and being hinged about a horizontal line adjacent to the lower edge of said aperture so as to be disposable in a first, closed position wherein it is in a vertical position and closes off said aperture; or a second, open position wherein it is inclined with respect to the vertical; conveyor means fixed to the side of the door which is disposed on the interior of the wall when the door is in a closed position; a shaft rotatably supported with respect to the wall; a cable having one end attached to shaft and the other end attached to the door at a point above and displaced from said horizontal line; and means for rotating said shaft in a first direction so as to wind said cable about said shaft and move the door to the closed position, and in a second direction so as to unwind said cable and move said door to the open position.

2. A device for use in connection with a wall having an aperture therein, comprising: a planar door member having a shape substantially that of said aperture and being hinged about a horizontal line adjacent to the lower edge of said aperture so as to be disposable in a first, closed position wherein it is in a vertical position and closes off said aperture, or a second, open position wherein it is inclined with respect to the vertical; conveyor means fixed to the side of the door which is disposed on the interior of the wall when the door is in a closed position; a shaft rotatably supported with respect to the wall; a cable having one end attached to shaft and the other end attached to the door at a point above and displaced from said horizontal line; motor means for rotating said shaft in a first direction so as to wind said cable about said shaft and move the door to the closed position, and in a second direction so as to unwind said cable and move said door to the open position; an electric circuit for energizing said motor; and limit switch means adapted to de-energize said motor at such time as it reaches its open or its closed position.

3. A device for use in connection with a wall having an aperture therein, comprising: a planar door member having a shape substantially that of said aperture and being hinged about a horizontal line adjacent to the lower edge of said aperture so as to be disposable in a first, closed position wherein it is in a vertical position and closes off said aperture, or a second, open position wherein it is inclined with respect to the vertical; a rotatable shaft disposed in a horizontal position and supported for rotation with respect to said wall; a cable having one end connected to the shaft so as to be windable about said shaft and the other end connected to the door at a point above and displaced from said horizontal axis; motor means for rotating said shaft in a first direction so as to wind said cable about said shaft and close said door, and in a second direction to unwind said cable about said shaft and close said door; a first limit switch adapted to stop said motor when actuated, said first switch being actuated when said door moves to said closed position; and a second limit switch adapted to stop said motor when actuated, said second switch being actuated when said door moves to said open position.

References Cited by the Examiner
UNITED STATES PATENTS

| 1,222,090 | 4/1917 | Findley | 268—74 |
| 1,380,229 | 5/1921 | Manheim | 268—74 |

SAMUEL F. COLEMAN, *Primary Examiner.*

ANDRES H. NIELSEN, *Examiner.*